United States Patent
Naka et al.

(10) Patent No.: US 7,164,935 B2
(45) Date of Patent: Jan. 16, 2007

(54) MOBILE TELEPHONE WITH SIMULTANEOUS POWER-ON AND TRANSMISSION SETTING FUNCTION

(75) Inventors: Yasushi Naka, Nara-ken (JP); Masahiro Emoto, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 432 days.

(21) Appl. No.: 10/270,968

(22) Filed: Oct. 15, 2002

(65) Prior Publication Data

US 2003/0087679 A1    May 8, 2003

(30) Foreign Application Priority Data

Oct. 16, 2001    (JP)    ............... 2001-318625

(51) Int. Cl.
*H04B 1/00*    (2006.01)

(52) U.S. Cl. .................. 455/565; 455/456.4; 455/566; 455/343.4

(58) Field of Classification Search ................ 455/565, 455/456.4, 574, 572, 343.4, 566
See application file for complete search history.

(56) References Cited

U.S. PATENT DOCUMENTS

| | | | | |
|---|---|---|---|---|
| 4,945,556 A | * | 7/1990 | Namekawa | ................. 455/565 |
| 5,681,108 A | * | 10/1997 | Miller | .......................... 700/92 |
| 6,011,973 A | * | 1/2000 | Valentine et al. | ......... 455/456.6 |
| 6,122,486 A | * | 9/2000 | Tanaka et al. | ................. 455/68 |
| 6,311,055 B1 | * | 10/2001 | Boltz | ....................... 455/414.1 |
| 6,317,593 B1 | * | 11/2001 | Vossler | .................... 455/414.1 |
| 6,421,544 B1 | * | 7/2002 | Sawada | ...................... 455/565 |
| 6,453,169 B1 | * | 9/2002 | Maloney | .................. 455/575.1 |
| 6,574,484 B1 | * | 6/2003 | Carley | ......................... 455/521 |
| 6,763,238 B1 | * | 7/2004 | Okano | ..................... 455/456.4 |

FOREIGN PATENT DOCUMENTS

| | | |
|---|---|---|
| JP | 11-308163 | 11/1999 |
| JP | 11-340901 | 12/1999 |
| JP | 2000-253140 | 9/2000 |
| JP | 2001-036456 | 2/2001 |
| JP | 2001-36456 | 9/2001 |
| JP | 2002-057751 | 2/2002 |
| JP | 2003-069669 | 3/2003 |

* cited by examiner

*Primary Examiner*—Edward F. Urban
*Assistant Examiner*—Adeel Haroon

(57) ABSTRACT

A control unit 102 of a mobile telephone 10 sets a radio wave mode to ON or OFF, and stores the setting of the radio wave mode internally. ON shows that radio wave transmission is permitted, and OFF shows that radio wave transmission is prohibited. When the stored radio wave mode setting is OFF, radio wave transmission is suppressed even if input such as that for mail transmission is received. By setting the radio wave mode to OFF, functions that do not require radio wave transmission can be used, even in places where radio wave transmission is prohibited.

12 Claims, 8 Drawing Sheets long press of "power button"

power OFF

MOBILE TELEPHONE WITH SIMULTANEOUS POWER-ON AND TRANSMISSION SETTING FUNCTION

This application is based on application No. 2001-318625 filed in Japan, the content of which is hereby incorporated by reference.

BACKGROUND OF THE INVENTION

1. Field of the Invention

The present invention relates to a mobile telephone that includes a function for suppressing the transmission of radio waves.

2. Description of the Related Art

Use of mobile telephones is prohibited in places such as hospitals and crowded trains because of the detrimental effect of radio waves transmitted by mobile telephones on medical devices and the like. It is necessary for people who have a mobile telephone (hereinafter "user(s)") to turn their mobile telephone off in such places.

However, in addition to call functions and electronic mail (hereinafter simply referred to as "mail") functions, modern mobile telephones perform various functions such as telephone book management, schedule management, reproduction of downloaded music, images and the like, games, and photography. Many of these functions do not require transmission of radio waves.

SUMMARY OF THE INVENTION

The object of the present invention is to provide a mobile telephone in which functions such as viewing received mail and transmitted mail, schedule management, and games can be used while a radio wave transmission function of the mobile telephone is suspended, even in a place where transmission of radio waves is prohibited.

In order to achieve the stated object, the mobile telephone of the present invention is a mobile telephone that communicates with use of radio waves, including: a radio wave flag setting unit for setting a radio wave flag that shows either ON or OFF, ON showing that transmission of radio waves is permitted, and OFF showing that transmission of radio waves is suppressed; and radio wave suppression unit for suppressing transmission of radio waves while the radio wave flag is set to OFF.

According to the stated construction, when the radio wave flag is set to OFF, the mobile telephone does not transmit radio waves, therefore while the mobile telephone is on, functions that do not require radio waves to be transmitted can be used even in a place where radio wave transmission is prohibited.

Here, the mobile telephone may further include: automatic power-on unit for, on occurrence of a predetermined event while power supply to main components is suspended, supplying power to the main components; and suppression flag setting unit for, on the automatic power on means supplying power to the main components, setting a suppression flag that shows whether transmission of radio waves is being suppressed, wherein the radio wave flag setting unit sets the radio wave flag to OFF when the predetermined event occurs and the suppression flag shows that transmission of radio waves is suppressed.

According to the stated construction, when the mobile telephone that is off is then turned on according to an auto-power-on function even in a place where use of mobile telephones is prohibited, the radio wave flag is set to OFF regardless of the stored radio wave flag. Therefore, radio wave transmission can be suppressed even if the user does not notice that the mobile telephone has been turned on.

Here, when a power-on operation and a predetermined operation are performed simultaneously by the user, the radio wave flag setting unit may set the radio wave flag to OFF and power may be supplied to main components.

According to the stated construction, the radio wave flag is set to OFF when the user presses the power button. Therefore, even in a place where use of mobile telephones is prohibited, radio wave transmission can be suppressed after the power has been turned on until the user sets the radio wave mode to ON.

Here, when a power-on operation and a predetermined operation are performed simultaneously by the user, the flag setting unit may set the radio wave flag to OFF and power may be supplied to main components.

According to the stated construction, when the power of the mobile telephone is off and the radio wave flag is set to OFF, the radio wave flag can be set to ON simultaneous to the power being turned on. Therefore, in an emergency radio waves can be transmitted as soon as the power is turned on.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 6A is a diagram of a screen 301 that is a function setting screen that is displayed by the display unit 103 of the mobile telephone 10 in which the radio wave mode is set to ON;

DESCRIPTION OF THE PREFERRED EMBODIMENT

The following describes the mobile telephone 10 as an embodiment of the present invention, with reference to the drawings.

1. Structure of the Mobile Telephone 10

Figure 1:
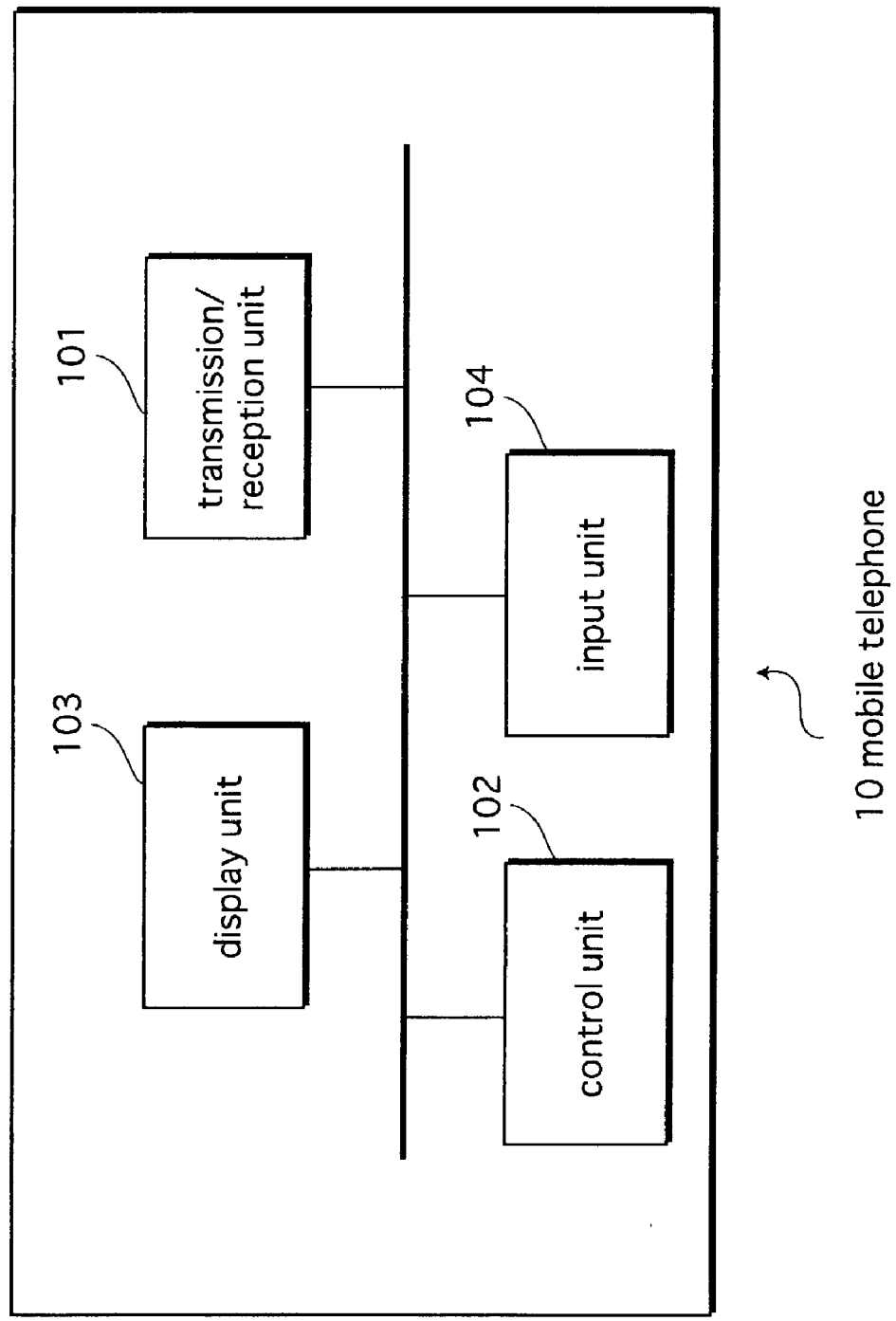
FIG. 1 is a block diagram showing the structure of a mobile telephone 10.
Figure 2:
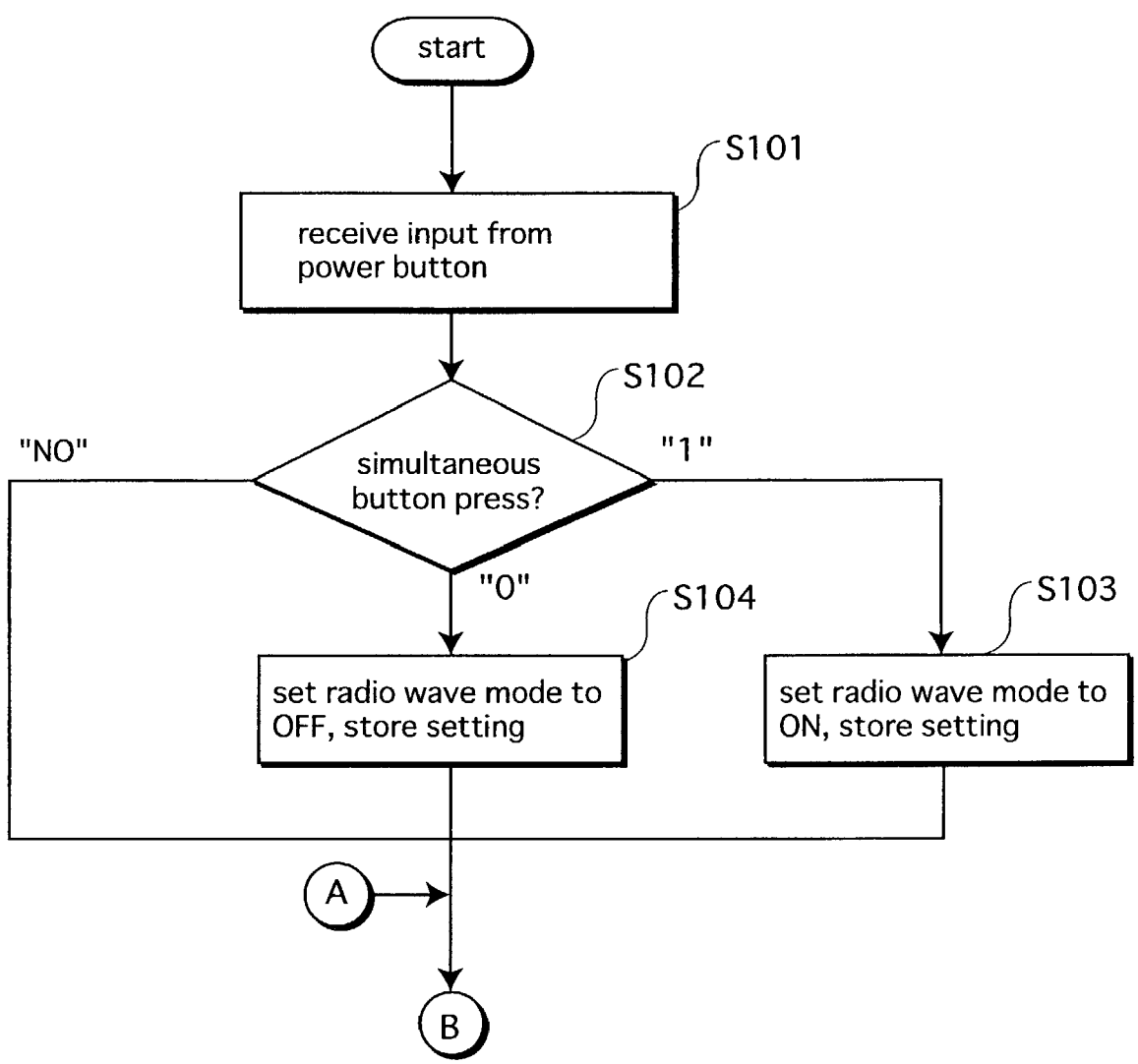
FIG. 2 is a flowchart, which continues in FIG. 3, showing operations of the mobile telephone 10.
Figure 3:
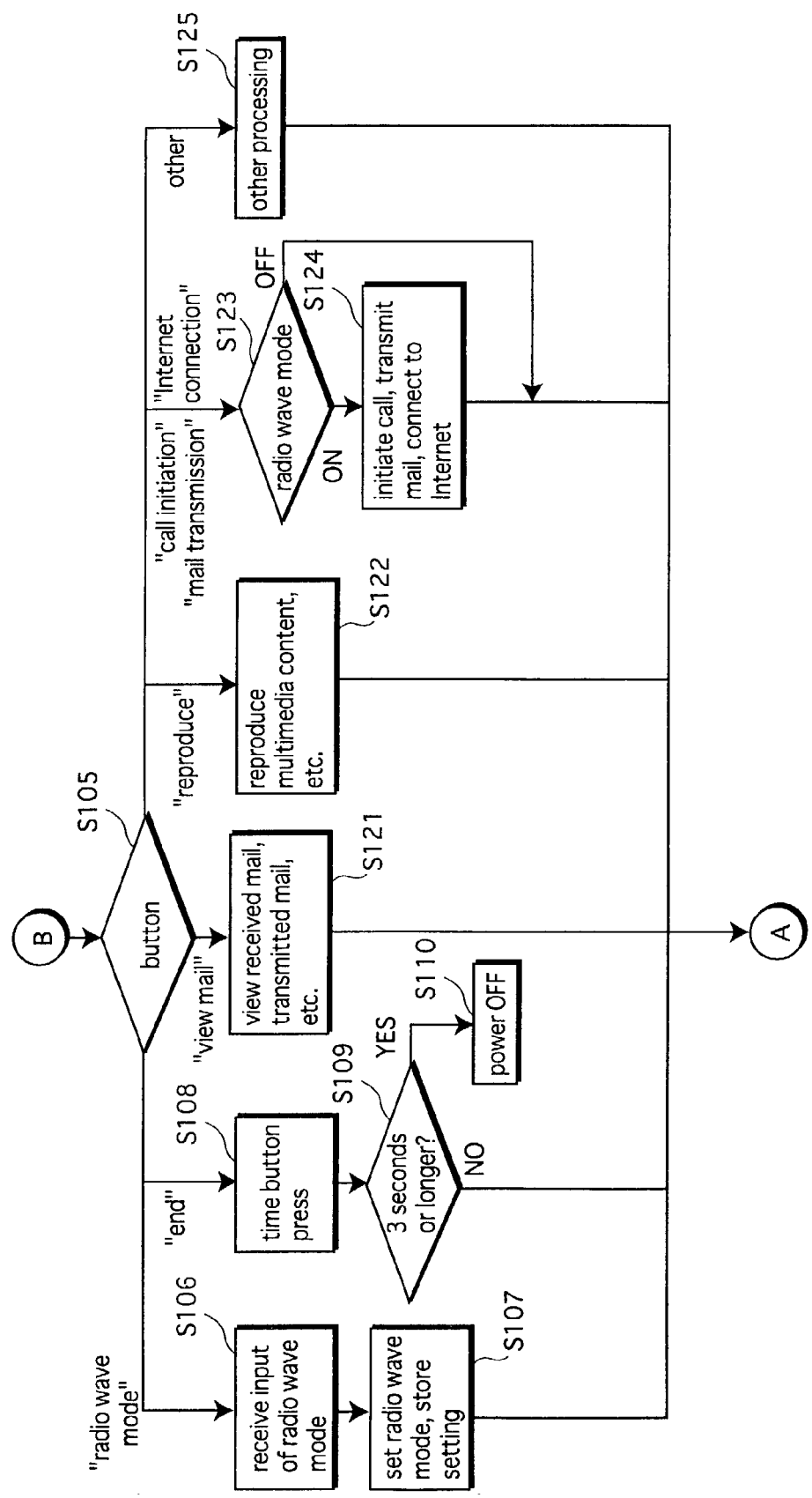
FIG. 3 is a flowchart, which continues from and returns to in FIG. 2, showing operations of the mobile telephone 10.

FIG. 1 is a block diagram showing the structure of the mobile telephone 10.

As shown in FIG. 1, the mobile telephone 10 is composed of a transmission/reception unit 101, a control unit 102, a display unit 103 and an input unit 104.

The mobile telephone 10 is a portable telephone that communicates with use of radio waves. Specifically, the mobile telephone 10 is a computer system that includes a microprocessor, a ROM (read only memory), a RAM (Random access memory), an LCD (liquid crystal display) unit, a key operation unit, a communication unit and an antenna.

The transmission/reception unit 101 performs communication such as transmission and reception of mail and connection to the Internet.

The control unit 102 stores a control program, and controls functions of the mobile telephone 10 such as calls, transmission and reception of mail, connection to the Internet, telephone book management, schedule management, multimedia content, and games. This control is performed according to the microprocessor executing the control program.

The control unit 102 further stores a radio wave mode. The radio wave mode is set to either ON or OFF. ON shows that transmission of radio waves is permitted, and OFF shows that transmission of radio waves is prohibited. The control unit 102 sets the radio wave mode in the following way.

The control unit 102 internally pre-stores the radio wave mode set to either ON or OFF. The control unit 102 receives input of the radio wave mode from the user via the input unit 104. When the received radio wave mode differs to the pre-stored radio wave mode, the control unit 102 stores the newly received radio wave mode instead of the pre-stored radio wave mode.

On receiving an input to initiate a call, transmit mail, or connect to the Internet from the user via the input unit 104, the control unit 102 reads the internally-stored radio wave mode, and when the radio wave mode is OFF, outputs an instruction to the transmission/reception unit 101 to suspend transmission of radio waves. On receiving an instruction from the control unit 102 to recommence transmission of radio waves, the transmission/reception unit 101 recommences transmitting radio waves.

The display unit 103, which includes the LCD, displays screens that are generated by the control unit 102. When each screen is being displayed, the display unit 103 further displays screens whose content corresponds to operations received from the user via the input unit 104.

The input unit 104 includes a plurality of buttons such as numeric keys, an up arrow, a down arrow, an "OK" button, and a power button. These buttons are provided on an operation surface of the mobile telephone 10. While the display unit 103 displays each screen, the input unit 104 receives operations from the user and outputs corresponding operation signals to the control unit 102.

The following describes power-on state and the power-off state of the mobile telephone 10.

"Power off" denotes a state is which power is supplied only to a monitoring unit in the mobile telephone 10. The monitoring unit denotes a clock function and the power button. The clock function operates to manage an alarm. The power button receives inputs by being pressed by the user.

The power being on denotes a state in which power is supplied to the main components of the mobile telephone 10. The main components include all the composite elements for achieving ordinary functions of the mobile telephone 10, such as communication and display functions.

2. Operations of the Mobile Telephone 10

The following describes the operations of the mobile telephone 10 with reference to the flowcharts in FIGS. 2 to 4, and FIGS. 5 to 8.

<Turning the Power on According to a Press of the Power Button>

The following describes operations of the mobile telephone 10 when power is supplied to the main components of the mobile telephone 10 according to the user pressing the power button.

The input unit 104 of the mobile telephone 10 receives an input to turn the power on (step S101), and judges which button the user has pressed simultaneously with the power button (step S102).

When the "1" button has been pressed simultaneously (step S102, "1"), the control unit 102 sets the radio wave mode to ON, and stores the set radio wave mode internally (step S103). An example of the screen displayed by the display unit 103 at this time is a screen 202 shown in FIG. 5B. The screen 202 is the ordinary stand-by screen. Here "pressed simultaneously" denotes detection of input by the power button while the "1" button is being pressed.

When the "0" button has been pressed simultaneously (step S102, "0"), the control unit 102 sets the radio wave mode to OFF, and stores the set radio wave mode internally (step S104). An example of the screen displayed by the display unit 103 at this time is a screen 201 shown in FIG. 5A. An antenna bar display area in the screen displays "OFF". Here "pressed simultaneously" denotes detection of input by the power button while the "0" button is being pressed.

Next, the control unit 102 judges the type of operation signal shown by the button that received the input (step S105).

When the operation signal shown by the button that recieved the input is "radio wave mode" (step S105, "radio wave mode"), the control unit recieves and input of radio wave mode via the input unit 104 (step S106), and rewrites the internally pre-stored radio wave mode to the recieved mode (step S107). The control unit 102 then returns to step S105 to continue processing.

Figure 6A:
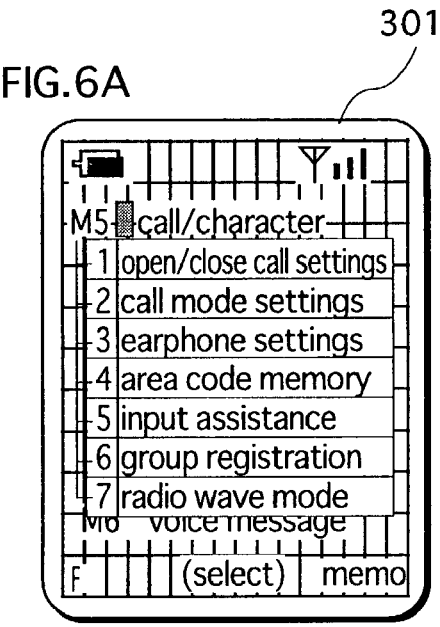
Figure 6B:
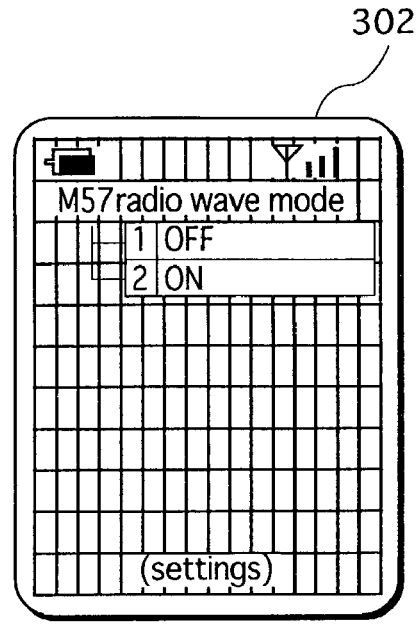
FIG. 6B is a diagram of a screen 302 that is displayed by the display unit 103, and that is used for setting the radio wave mode to ON and OFF.
Figure 6D:
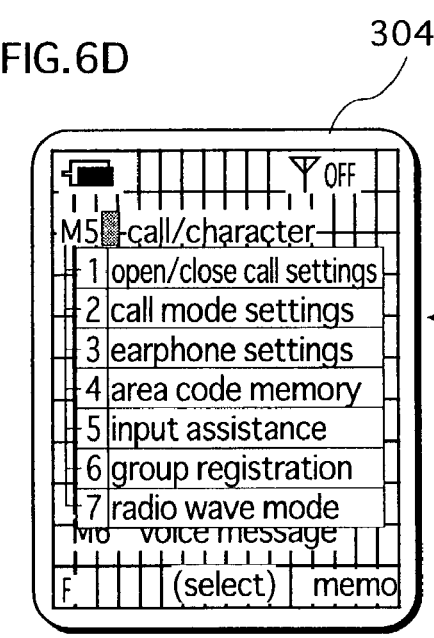
FIG. 6D is a diagram of a screen 304 that is a function setting screen that is displayed by the display unit 103 of the mobile telephone 10 whose radio wave mode is set to OFF.
Figure 6C:
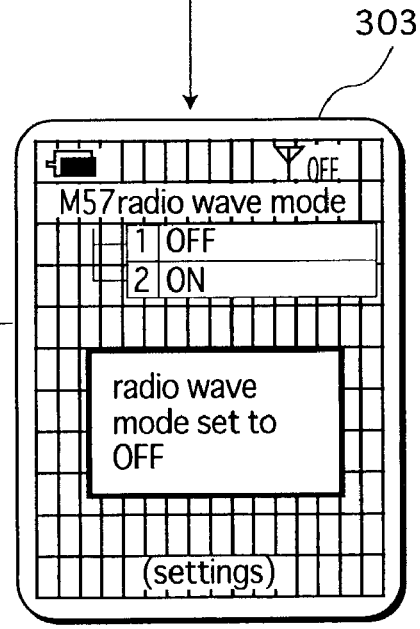
FIG. 6C is a diagram of a screen 303 that is displayed by the display unit 103, and that is for the user to confirm the set radio wave mode.

Examples of the screens displayed by the display unit 103 at this time are shown in FIGS. 6A to 6D. A screen 301 shown in FIG. 6A is for setting various functions, and is displayed when selecting the radio wave mode setting. Antenna bars are displayed in the antenna bar display area. This shows that the radio wave mode of the mobile telephone is ON. A screen 302 shown in FIG. 6B is displayed when selecting to set the radio wave mode either ON or OFF. A screen 303 shown in FIG. 6C is for the user to confirm the newly-set radio wave mode OFF. A screen 304 in FIG. 6D is displayed after the radio wave mode has been set. Here, "OFF" displayed in the antenna bar display area shows that radio wave mode is OFF.

When the operation signal shown by the button that received the input is "end" (step S105, "end"), the control unit 102 measures the length of time that the "END" button is held down by the user (step S108), and judges whether the measured length of time is at least three seconds (step S109). If the measured length of time is at least three seconds (step S109, YES), the control unit 102 stops the supply of power to the main components, and turns the power off (step S110). If the measured length of time is less than three seconds (step 109, NO), the control unit 102 returns to step S105 to continue processing.

When the operation signal shown by the button that received the input is "view mail" (step S105, "view mail"), the control unit 102 reads internally-stored received mail, transmitted mail, and so on, displays the read screens on the display 103, and performs processing for viewing (step S121). The control unit 102 then returns to step S105 to continue processing.

When the operation signal shown by the button that received the input is "reproduce" (step S105, "reproduce"), the control unit 102 reads internally-stored, pre-downloaded multimedia content such as a game, animation, music or the like, performs reproduction processing by outputting to the display unit 103 and a speaker as appropriate (step S122). The control unit 102 then returns to step S105 to continue processing.

When the operation signal shown by the button that received the input is one of "call initiation", "mail transmission" and "Internet connection" (step S105, "call initiation", "mail transmission", or "Internet connection"), the control unit 102 distinguishes the internally-stored radio wave mode (step S123).

When the radio wave mode is ON (step S123, ON), the control unit 102 performs processing for initiating a call, transmitting mail or connecting to the Internet according to the type of operation signal (step S124). The control unit 102 then returns to step S105 to continue processing.

Figure 7A:
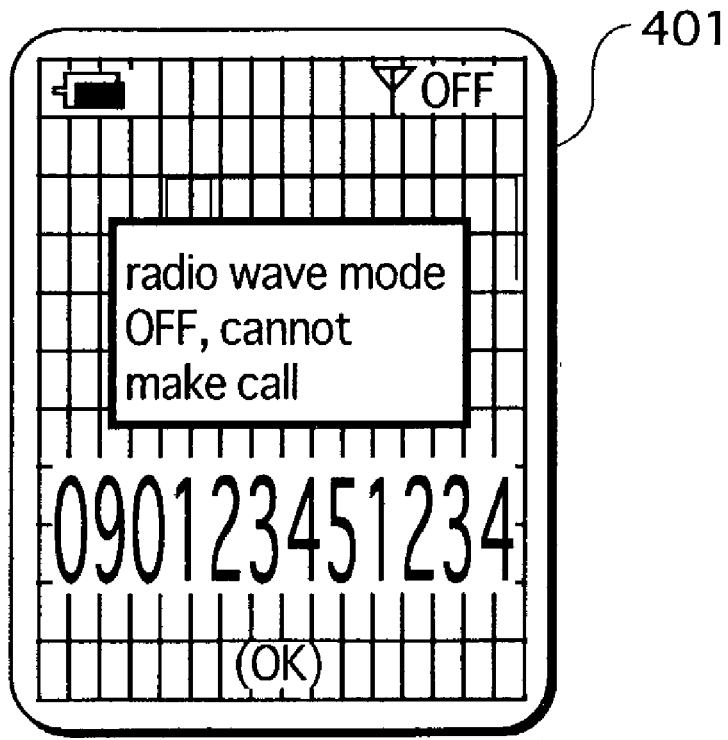
FIG. 7A is a diagram of a screen 401 displayed by the display unit 103 when input to make a call is received while the radio wave mode of the mobile telephone 10 is set to OFF.
Figure 7B:
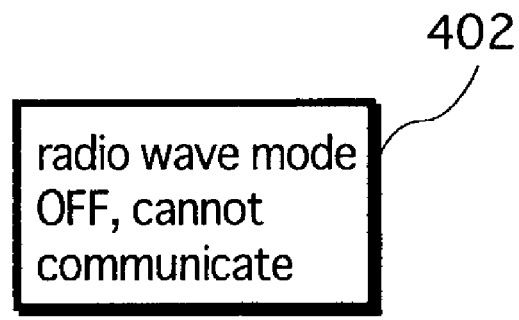
FIG. 7B is a diagram of a screen 402 displayed by the display unit 103 when input to transmit mail or connect to the Internet is received while the radio wave mode of the mobile telephone 10 is set to OFF.

When the radio wave mode is set to OFF (step S123, OFF), the control unit 102 returns to step S105 to continue processing. Examples of screens displayed by the display unit 103 at this time are shown in FIGS. 7A and 7B. A screen 401 shown in FIG. 7A is displayed when the operation signal is "call initiation". A screen 402 shown in FIG. 7B is displayed when the operation signal is "mail transmission" or "Internet connection". processing.

<Auto-power-on Function>

The following describes operations by the mobile telephone 10 for when power is supplied to the main components of the mobile telephone 10 according to the auto-power-on function or the alarm-power-on function.

The auto-power-on function turns on the mobile telephone 10, which has been turned off, at a specific pre-set time. At the specific time, the control unit 102 instructs a power supply unit to supply power to the main components. The alarm-power-on function turns the mobile telephone 10 on at a specific time and has an alarm sound output via the speaker when it turns the mobile telephone 10 on.

Figure 8A:
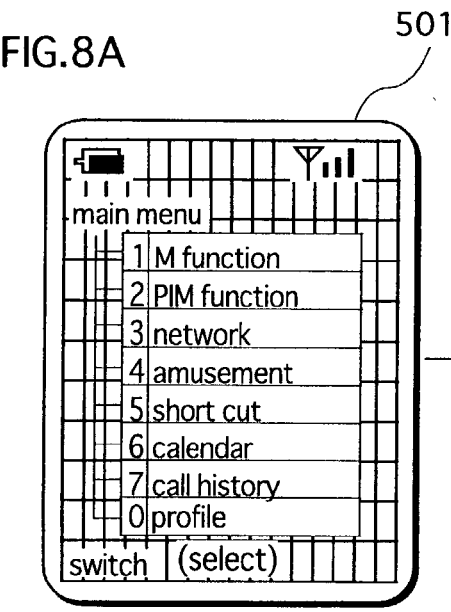
FIG. 8A is a diagram of a main menu screen 501 displayed by the display unit 103.
Figure 8B:
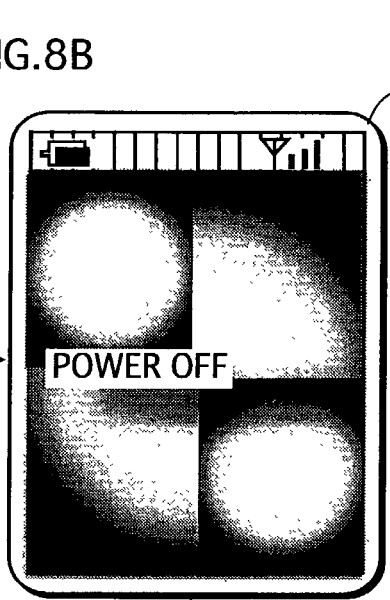
FIG. 8B is a diagram of a screen 502 displayed by the display unit 103.
Figure 8C:
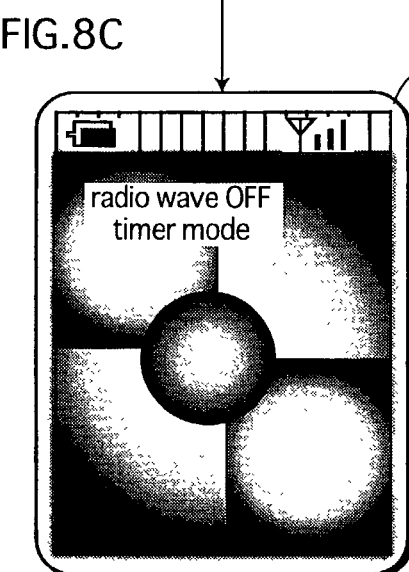
FIG. 8C is a diagram of a screen 503 displayed by the display unit 103 at "auto-power-on", that shows that the radio wave mode is set to OFF.

The following describes with use of FIGS. 8A to 8C the method for turning the mobile telephone 10 on by either the auto-power-on function or the alarm-power-on function and setting the radio wave mode to "OFF".

The auto-power-on function or the alarm-power-on function is pre-set in the mobile telephone 10. On the input unit 104 detecting a long press of the power button while the display unit 103 displays a screen 501 shown in FIG. 8A, the mobile telephone 10 is turned on by the auto-power-on function or the alarm-power-on function. On the mobile telephone 10 being turned on, the control unit 102 sets a suppression flag to show that the radio wave mode is set to OFF, and stores the set suppression flag internally.

The display unit 103 then displays a screen 502 shown in FIG. 8B, to show the user that the power of the mobile telephone 10 is to be turned off. Next, when the mobile telephone 10 is turned on at the pre-set time according to auto-power-on or alarm-power-on, the display unit 103 displays a screen 503 shown in FIG. 8C showing that the radio wave mode has been set to OFF. Then the control unit 102 turns the mobile telephone 10 off.

Figure 4:
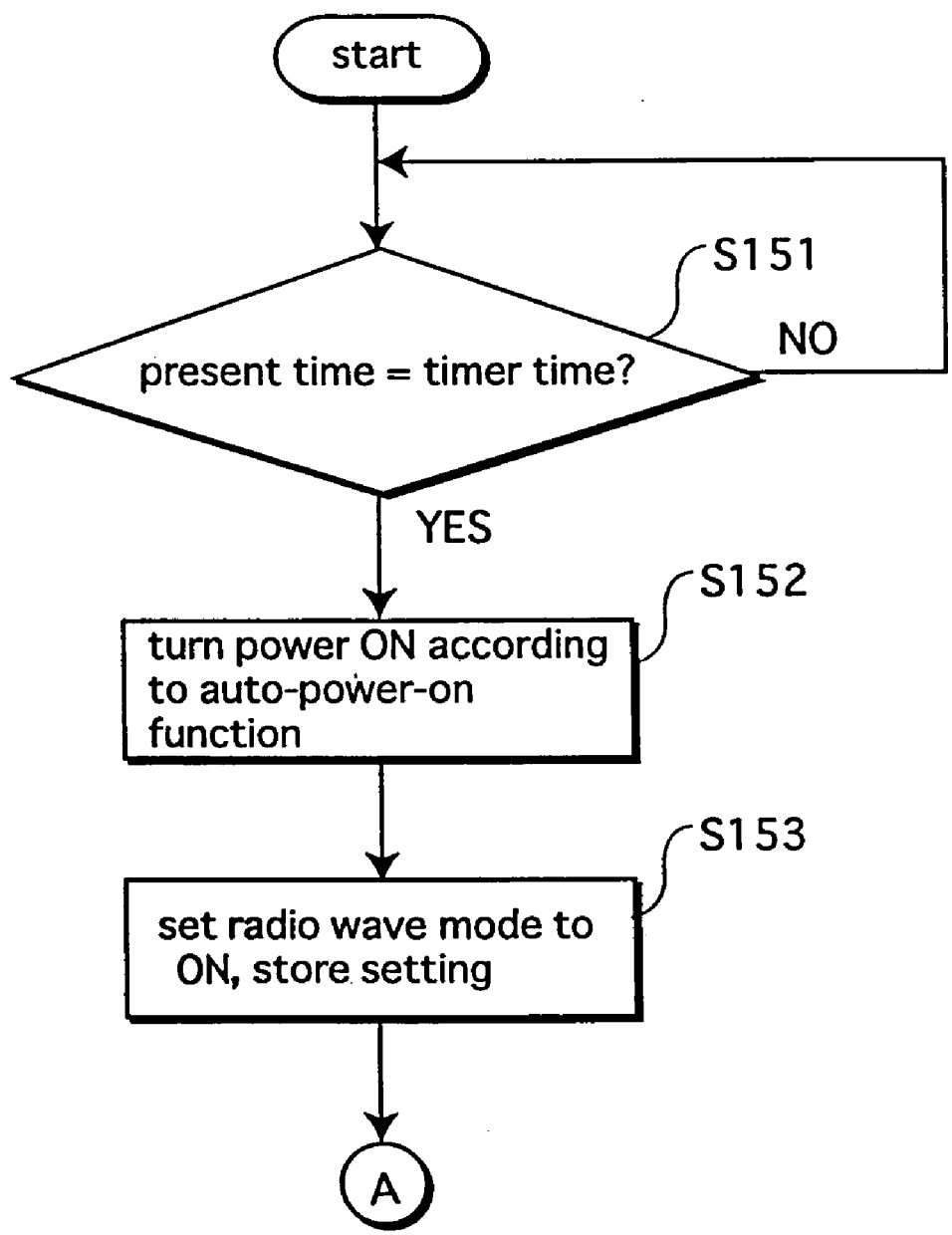
FIG. 4 is a flowchart showing operations of the mobile telephone 10 at "auto-power-on"
Figure 5A:
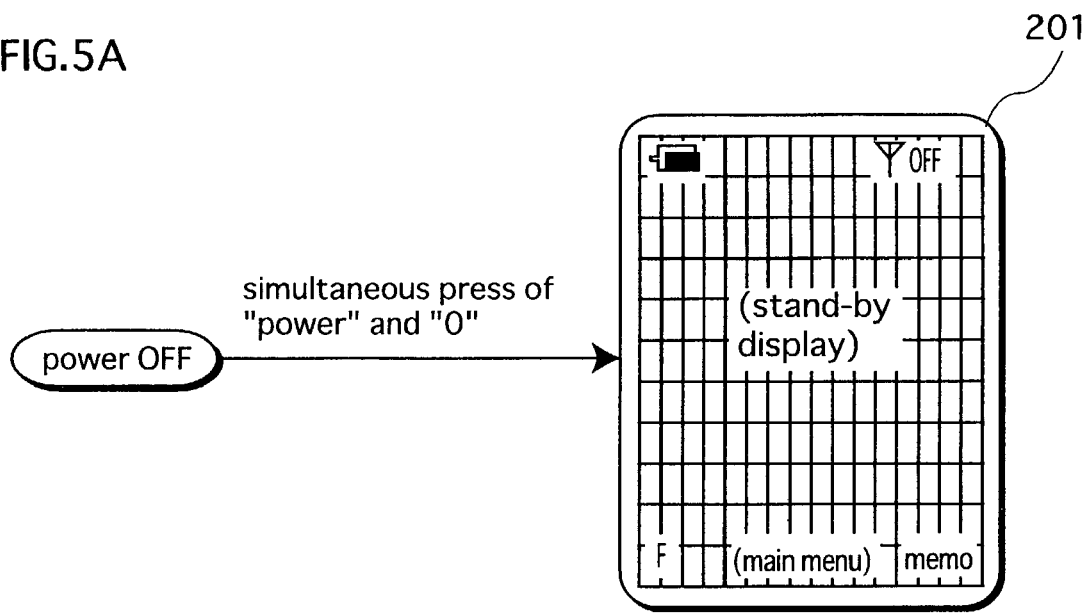
FIG. 5A is a diagram of a screen 201 that is displayed by a display unit 103 when a "0" button is pressed together with a power button.
Figure 5B:
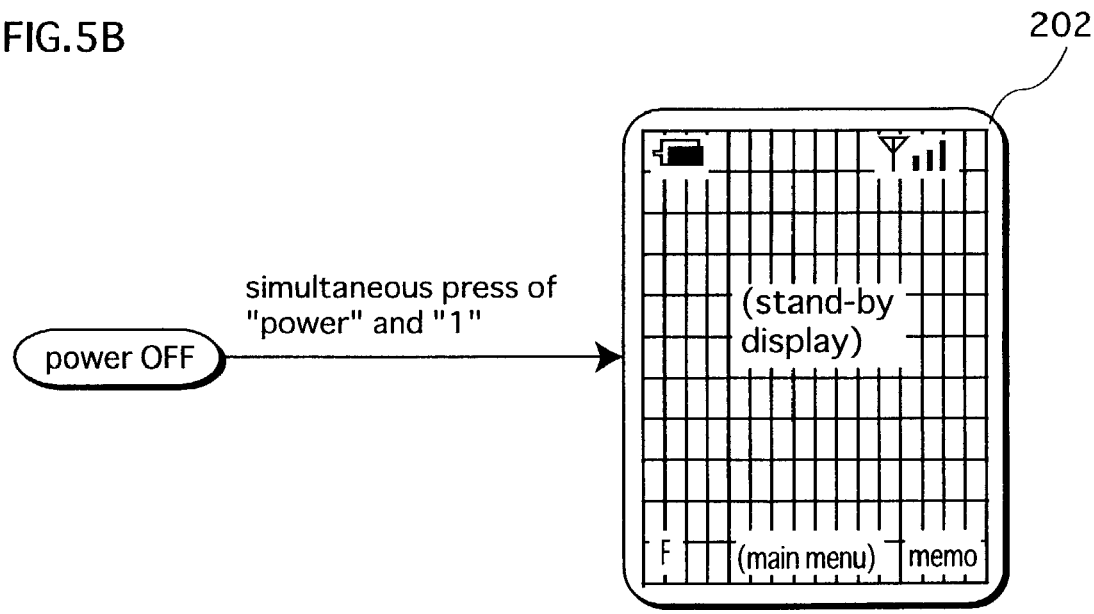
FIG. 5B is a diagram of a screen 202 that is displayed by a display unit 103 when a "1" button is pressed together with a power button.

The following describes with use of the flowchart in FIG. 4 operations of the mobile telephone 10 when the auto-power-on function or the alarm-power-on function and the suppression flag have been set.

The control unit 102 judges whether the present time is the pre-set time (step S151), and if the present time is the pre-set time (step S151, YES), the control unit 102 has the mobile telephone 10 turned on, by outputting an instruction to the power supply unit to supply power to the main components, and by the power supply unit supplying power to the main components (step S152). Next, the control unit 102 reads the internally-stored radio wave mode, and if the radio wave mode is set to OFF, continues processing. If the radio wave mode is set to ON, the control unit 102 stores ON instead of OFF as the radio wave mode (step S153).

At step S151, when the present time is not the pre-set specified time (step S151, NO), the control unit 102 repeats step S151.

3. Conclusion

As has been described, according to the present invention the control unit 102 of the mobile telephone 10 has a function of setting a radio wave mode showing whether radio wave transmission is ON or OFF, and storing the setting. On receiving an operation instruction for initiating a call, transmitting mail, or the like, the control unit 102 reads the internally-stored radio wave mode, and, when the radio wave mode is OFF, suppresses the radio wave transmission function of the transmission/reception unit 101.

Note that the present invention is not limited to the above-described embodiment. The following cases are also included in the present invention.

(1) The method for setting the radio wave mode is not limited to the above-described method in which the control unit 102 receives an input of the radio wave setting via the input unit 104 while a function setting screen is displayed by the display unit 103. For example, the input unit 104 may include a "radio wave button" that is similar to a conventional "manner button", and the radio wave mode may be switched on and off by the user pressing the radio wave button.

(2) The method of setting the radio wave mode is not limited to setting the radio wave mode to OFF while the power is on by a simultaneous long press of the power button and the "0" button, and setting the radio wave to ON while the while the power is on by a simultaneous long press of the power button and the "1" button. The button pressed simultaneously with the power button in each case may be instead be any button besides "0" and "1 respectively.

(3) The method for setting the radio wave mode to be OFF when the power is turned on according to the auto-power-on function is not limited to a long press of the power button in a menu screen. For example, the radio wave mode may be set to be OFF in a screen for setting the auto-power-on time.

(4) The control unit 102 may have a structure in which, when the radio wave mode is set to OFF, it switches the radio wave mode to ON and performs call initiation processing when the input unit receives input for initiating a call to a predetermined emergency services number.

(5) The present invention may be methods shown by the above. Furthermore, the methods may be a computer program realized by a computer, and may be a digital signal of the computer program.

Furthermore, the present invention may be a computer-readable recording medium apparatus such as a flexible disk, a hard disk, a CD-ROM (compact disk-read only memory), and MO (magneto-optical), a DVD-ROM (digital versatile disk-read only memory), a DVD-RAM (digital versatile disk random access memory), or a semiconductor memory, that stores the computer program or the digital signal. Furthermore, the present invention may be the computer program or the digital signal recorded on any of the aforementioned recording medium apparatuses. Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(6) The present invention may be any combination of the above-described embodiments and modifications.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A mobile telephone that communicates with use of radio waves, comprising:
    a radio wave state selection button for switching between ON and OFF in order to select therebetween, according to a press by a user, ON showing that transmission of radio waves is permitted, and OFF showing that transmission of radio waves is suppressed;
    radio wave transmission setting means for setting ON or OFF as selected according to the radio wave state selection button;
    radio wave suppression means for receiving radio waves and suppressing only transmission of radio waves while radio wave transmission is OFF; and
    radio wave state display means for, while radio wave transmission is OFF, performing a display showing that radio wave transmission is OFF,
    wherein, when power-on operation and a specific operation are performed simultaneously by the user when power is in an off state, power is turned on and when ON is already set in the radio wave setting means when the power-on operation and the specific operation are performed, the setting in the radio wave setting means is changed to OFF, and when OFF is already set in the radio wave setting means when the power-on operation and the specific operation are performed, the setting in the radio wave setting means is changed to ON.

2. The mobile telephone of claim 1, further comprising:
    automatic power-on means for, on occurrence of a predetermined event while power supply to main components is suspended, supplying power to the main components; and
    suppression setting means for, on the automatic power-on means supplying power to the main components, setting whether or not radio wave transmission is being suppressed,
    wherein the radio wave transmission setting means sets radio wave transmission OFF when the predetermined event occurs and radio wave transmission is suppressed by the suppression setting means, regardless of the selection according to the radio wave state selection button.

3. The mobile telephone of claim 1, further comprising;
    input means for receiving input from a user,
    wherein, when the input means receives input of a request to transmit radio waves while radio wave transmission is OFF, the mobile telephone radio wave state display means performs the display showing tat radio wave transmission is OFF.

4. The mobile telephone of claim 1, wherein,
    on the mobile telephone receiving input of a transmission to a specific telephone number, to radio wave transmission means sets radio wave transmission ON, regardless of the selection according to the radio wave state selection button.

5. A mobile telephone that communicates with use of radio waves, comprising:
    a radio wave stats selection button for switching between ON and OFF in order to select therebetween, according to a press by a user, ON showing What transmission of radio waves is permitted, end OFF showing that transmission of radio waves is suppressed; and
    radio wave state display means for, when the input means receives input of a request to transmit radio waves when OFF is selected according to the radio wave state selection button, displaying that the radio wave transmission is OFF,
    wherein when a power-on operation and a specific operation are performed simultaneously by the user when power is in an off state, power is turned on and when ON is already set in the radio wave setting means when the power-an operation and the specific operation are performed, the setting in the radio wave setting means is changed to OFF, and when OFF is already set in the radio wave setting means when the power-on operation and the specific operation are performed, the setting in the radio wave setting means is changed to ON.

6. The mobile telephone of claim 5, further comprising:
    automatic power-on means for, on occurrence of a predetermined event while power supply to main components is suspended, supplying power to the main components; and
    suppression setting means for, on the automatic power-on mans supplying power to the main components, setting whether or not radio wave transmission is being suppressed,
    wherein the mobile telephone sets the radio wave transmission suppression function OFF when the predetermined events occur and radio wave transmission is suppressed by the suppression setting means, regardless of the selection according to the radio wave state selection button.

7. The mobile telephone of claim 5, wherein,
when the mobile telephone receives input of a transmission to a specific telephone number, the radio wave transmission function is set ON, regardless of the selection according to the radio wave state selection button.

8. A mobile telephone that communicates with use of radio waves, comprising:
input mans for receiving input from a user including a radio wave state selection button for switching between ON and OFF in order to select therebetween, according to a press by the user, ON showing that transmission of radio waves is permitted and OFF showing that transmission of radio waves is suppressed; and
radio wave state display means for, when the input mans receives input of a request to transmit radio waves while a radio wave transmission function of the mobile telephone is suppressed, displaying that the radio wave transmission is OFF including a display screen for displaying a combination of a symbol indicating transmission capability and indicia indicating an OFF status,
wherein, the input means further includes a plurality of operator input members wherein, when a power-on operation and a specific operation are performed simultaneously by the user on a pair of operator input members, the radio wave transmission function is set to one of ON and OFF, and power is supplied to main components of the mobile telephone, and when ON is already set in the radio wave setting means when the power-on operation and the specific operation are performed, the setting in the radio wave setting means is chanted to OFF, and when OFF is already set in the radio wave setting means when the power-on operation and the specific operation are performed the setting in the radio wave setting means is changed to ON.

9. The mobile telephone of claim 8, further comprising
automatic power-on means for, on occurrence of a predetermined event while power supply to main components is suspended, supplying power to the main components; and
suppression setting means for, on the automatic power-on means supplying power to the main components, setting whether or not radio wave transmission is being suppressed,
wherein the mobile telephone sets the radio wave transmission suppression function OFF when the predetermined events occurs and radio wave transmission is suppressed by the suppression setting means, regardless of the selections inputted by the radio wave state selection button.

10. The mobile telephone of claim 9,
wherein, when the mobile telephone receives input of a transmission to a specific telephone number, the radio wave transmission function is automatically set ON regardless of the selections inputted by the radio wave state selection button and the symbol indicating transmission capability is display in combination with antenna bars indicating strength of signal.

11. The mobile telephone of claim 9 where the symbol indicating transmission capability is a graphic indicative of an antenna.

12. The mobile telephone of claim 9 where the plurality of operator input members include a power button and means for monitoring a time period that the power button is continuously depressed, whereby when a predetermined time period is reached and/or surpassed power is turned OFF.

* * * * *